March 17, 1964  H. HOFFMANN  3,125,079
MULTI-PURPOSE INTERNAL COMBUSTION ENGINE
Filed March 20, 1961
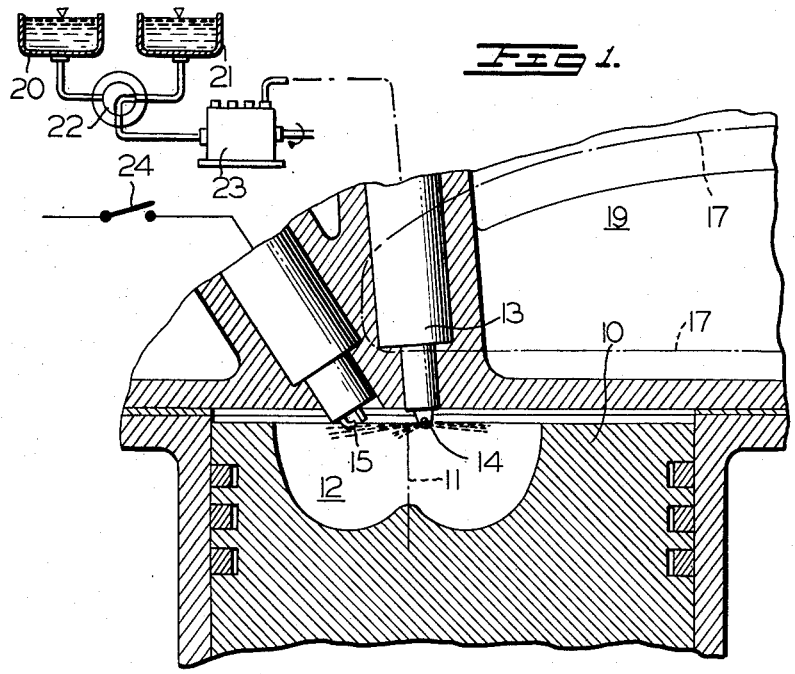
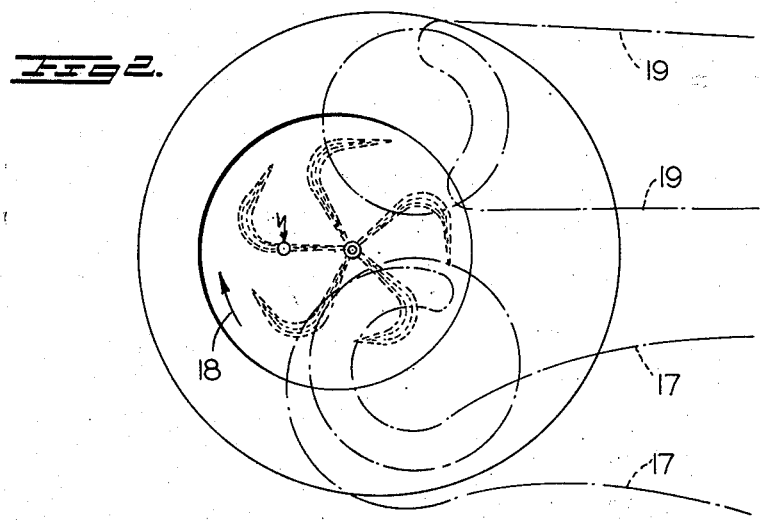
INVENTOR
HEINRICH HOFFMANN
BY *Dicke, Craig & Freudenberg*
ATTORNEYS

United States Patent Office 3,125,079
Patented Mar. 17, 1964

3,125,079
MULTI-PURPOSE INTERNAL COMBUSTION ENGINE
Heinrich Hoffmann, Stuttgart-Unterturkheim, Germany, assignor to Daimler-Benz Aktiengesellschaft, Stuttgart-Unterturkheim, Germany
Filed Mar. 20, 1961, Ser. No. 96,776
Claims priority, application Germany Apr. 1, 1960
9 Claims. (Cl. 123—32)

The present invention relates to an internal combustion engine provided with fuel injection adapted to inject selectively either gasoline or diesel fuel and with an air eddy or vortex within the combustion space about an axis in the longitudinal direction of the cylinder.

The known prior art multi-fuel internal combustion engines operate under diesel fuel as well as under gasoline operation with auto-ignition or self-ignition. In contradistinction thereto, it is proposed in accordance with the present invention to provide, with equal compression ratios, the gasoline-fuel operation with an externally timed applied ignition and the diesel-fuel operation with self-ignition, which is made possible by the selection of a compression ratio such as, for instance, 1:15 which is relatively low for diesel engines and relatively high for Otto engines.

By reason of the use of an ignition method suitable for each of the two fuels, operating characteristics may be expected in accordance with the present invention which are satisfactory for both types of operations.

In particular, it is proposed in accordance with the present invention to utilize a piston combustion chamber having at least approximately an axially symmetrical shape with an axis extending essentially in the cylinder longitudinal direction, and to cause the fuel injection to take place, preferably by means of a multi-apertured nozzle, from within the area of this axis. In this manner, the fuel hardly comes into contact with the cylinder and/or piston combustion chamber walls which is favorable for the self-ignition operation with diesel fuel, especially during starting with relatively cold walls since the compression ratio, mentioned hereinabove for the operation of the internal combustion engine of the present invention is relatively low for auto-ignition operation. On the other hand, the compression ratio is relatively high for the gasoline applied ignition operation so that there exists a certain danger of knocking. This danger of knocking is considerably reduced already by the compact combustion chamber form and by the air vortex which prevents the undisturbed formation of knocking or pinking pockets remote from the ignition or spark plug, but may be further reduced by the following additional measures: the strength of the air eddy or vortex and the penetrating force of the fuel jets directed essentially radially are so matched or adapted to one another that the jets do not reach the cylinder walls, possibly also the piston combustion chamber walls, with the piston in the upper dead center position or thought of in the upper dead center position but instead are deflected prior thereto in the circumferential direction. As a result thereof, no fuel or only very little fuel is present in the parts of the combustion space remote from the spark plug so that the danger of self-ignition is considerably reduced. On the other hand, the aforementioned matching is also favorable for diesel operation as it avoids by such matching the likelihood that the fuel comes into contact with the relatively cold combustion chamber walls during starting of the vehicle.

Accordingly, it is an object of the present invention to provide a multi-fuel internal combustion engine which effectively eliminates the drawbacks encountered in the prior art constructions and more particularly the necessity of operating the engine with the same type of ignition.

Another object of the present invention resides in the provision of an internal combustion engine which may be readily operated with diesel as well as gasoline fuels.

Still another object of the present invention resides in the provision of an internal combustion engine which may be operated as gasoline engine with a compression ratio relatively higher than normal for Otto engines and as diesel engine with a compression ratio which is relatively low for diesel engines, especially in order to enable operation as gasoline engine with externally applied ignition and operation as diesel with self-ignition.

Still another object of the present invention resides in the provision of an internal combustion engine of the type indicated hereinabove which operates with either gasoline or diesel fuel and which offers favorable starting characteristics even under diesel operation with slight danger of knocking under gasoline operation.

Another object of the present invention resides in the provision of an internal combustion engine adapted to operate with either diesel or gasoline fuels in which the combustion process is so correlated to the combustion chamber and the ignition means as well as the air inlet means that the essentially radially injected fuel particles of the radially outwardly directed jets are effectively prevented from reaching the cylinder and/or piston combustion chamber walls during operation of the engine.

These and other objects, features and advantages of the present invention will become more obvious from the following description when taken in connection with the accompanying drawing which shows, for purposes of illustration only, one embodiment in accordance with the present invention, and wherein FIGURE 1 is a partial cross sectional view through an internal combustion engine in accordance with the present invention provided with a schematically shown fuel supply system leading to the injection nozzle and with an energizing circuit leading to the spark plug, and FIGURE 2 is a top plan view of the piston of FIGURE 1.

Referring now to the drawing wherein like reference numerals are used throughout the two views to designate corresponding parts, and more particularly to FIGURE 1, reference numeral 10 designates therein the piston which is provided with a combustion chamber 12 having a shape axially symmetrical about the axis 11. In the illustrated embodiment, the combustion chamber 12 is of ω-shape though it is understood that the present invention is not limited thereto but any other appropriate shape may be used, such as a cylindrical or a semi-spherical shape of the combustion chamber 12.

The injection nozzle 13 is constructed as a nozzle provided with five apertures which injects the fuel into the combustion space 12 almost in the transverse or diagonal direction of the piston. Approximately half-way between the orifice 14 of the injection nozzle 13 and the walls of the piston combustion chamber 12 are located the electrodes 15 of the spark plug 16.

The inlet channel of which the walls are designated in FIGURES 1 and 2 by reference numeral 17 are curved spirally so that an eddying movement or vortex is imparted to the air entering the cylinder which lasts until the combustion stroke. The direction of this vortex is indicated by arrow 18 in FIGURE 2. The air eddy or vortex, however, may be also produced by any other suitable appropriate and known arrangement, for example, by a deflector valve. The walls of the outlet channel are designated by reference numeral 19.

The fuel reaches the injection pump 23, either from the tank 20 for gasoline or the tank 21 for diesel fuel, through a shifting valve 22 and is supplied from the injection pump 23 to the injection nozzle 13 in the conventional manner. The possibility to selectively turn off or render inoperative the spark plug 16 is indicated by a schematic switch 24 provided within the electric circuit conducting the current to the spark plug 16. If the engine is operated for longer periods of time with diesel fuel only, then it is recommendable to replace the plug 16 by a blind plug.

As may be readily seen from FIGURE 2, the fuel jets which ordinarily would penetrate up to the walls of the piston combustion chamber 12 are deflected from the normal path thereof by the air vortex 18 so that a zone is formed at the periphery of the combustion chamber which is free of fuel or at least lean in fuel thereby providing effectively a stratification also at partial loads.

While I have shown and described one embodiment in accordance with the present invention, it is understood that the same is not limited thereto but is susceptible of many changes and modifications within the spirit and scope of the present invention.

For example, the coordination between injection and piston position is shown only for purposes of illustration. The fuel may be injected also in any other position of the piston, depending on the preselected compression ratio, the strength of the air vortex and other operating conditions.

Thus, it is quite clear that the present invention is susceptible of many changes and modifications within the spirit and scope thereof and I, therefore, do not wish to be limited to the details shown and described herein but intend to cover all such changes as are encompassed by the scope of the appended claims.

I claim:

1. An internal combustion engine adapted to operate selectively, at the same compression ratio, with gasoline or diesel fuel injection, comprising cylinder means, piston means within said cylinder means and delimiting in part a combustion chamber which is at least approximately axially symmetrical, means for producing an air vortex within said combustion chamber about an axis extending essentially in the cylinder longitudinal direction, multi-apertured injection means for substantially simultaneously injecting from within the area of said first-mentioned axis essentially radially directed fuel jets into said combustion chamber spaced substantially over the entire combustion chamber cross section as seen in a plane perpendicular to said axis, and means enabling applied ignition operation of said engine with gasoline fuel injection while enabling auto-ignition operation of said engine with diesel fuel injection, the compression ratio of said engine, which remains constant for gasoline and diesel fuel operation, being selected to be relatively low for diesel engines and relatively high for Otto engines to enable said engine to operate with applied ignition in case of gasoline fuel injection and with self-ignition in case of diesel fuel injection, the strength of said air vortex and the penetrating power of the essentially radially directed fuel jets being so matched to one another that said fuel jets fail to reach the cylinder walls but are deflected prior thereto essentially in the circumferential direction by said air vortex.

2. An internal combustion engine adapted to operate selectively, at the same compression ratio, with gasoline or diesel fuel injection according to claim 1, wherein said compression ratio is about 1:15.

3. An internal combustion engine adapted to operate selectively, at the same compression ratio, with gasoline or diesel fuel injection according to claim 1, wherein said combustion chamber has an axis extending essentially in the cylinder longitudinal direction and is of approximately ω-shape in cross-sectional planes including said last-mentioned axis.

4. An internal combustion engine adapted to operate selectively, at the same compression ratio, with gasoline or diesel fuel injection comprising cylinder means, piston means within said cylinder means and delimiting in part a combustion chamber which is at least approximately axially symmetrical, means for producing an air vortex within said combustion chamber about an axis extending essentially in the cylinder longitudinal direction, multi-apertured injection means for injecting substantially simultaneously from within the area of said first-mentioned axis essentially radially directed fuel jets into said combustion chamber spaced substantially over the entire combustion chamber cross section as seen in a plane perpendicular to said axis, and means enabling applied ignition operation of said engine with gasoline fuel injection while enabling auto-ignition operation of said engine with diesel fuel injection, the compression ratio of said engine, which remains constant for gasoline and diesel fuel operation being selected to be relatively low for diesel engines and relatively high for Otto engines to enable said engine to operate with applied ignition in case of gasoline fuel injection and with self-ignition in case of diesel fuel injection, the strength of said air vortex and the penetrating power of the essentially radially directed fuel jets being so matched to one another that said fuel jets fail to reach the cylinder walls inclusive the piston combustion chamber walls that would lie in the path of said jets with said piston means in the upper dead center position but are deflected prior thereto essentially in the circumferential direction by said air vortex.

5. In an internal combustion engine adapted to operate selectively with gasoline or diesel fuels and having cylinder means and piston means, the improvement essentially consisting of operating said engine, at the same compression ratio, either with gasoline fuel and externally-controlled ignition or with diesel fuel and auto-ignition, comprising means forming a combustion chamber having at least approximately an axially symmetrical shape about an axis extending essentially parallelly to the cylinder axis, means for producing within said combustion chamber an eddying movement of the combustion air, and injection means for injecting selectively either said gasoline fuel or said diesel fuel into said combustion chamber from within the area of this first-mentioned axis, the compression ratio of said engine being so selected as to be relatively high for Otto engines and relatively low for diesel engines to enable operation, with the same compression ratio, as gasoline engine with applied ignition and as diesel fuel engine with auto-ignition, and the strength of the combustion air eddy and the penetrating force of the injected fuel being so matched to one another that the injected fuel is prevented essentially from reaching the wall portions formed by the cylinder means and lying in the normal injection paths thereof substantially over the entire combustion chamber as viewed in a plane substantially perpendicular to said axis but are deflected in the circumferential direction by said combustion air eddy.

6. A method for operating as gasoline engine or diesel engine at the same compression ratio an internal combustion engine having cylinder means, piston means defining at least in part a combustion chamber, and fuel injection means, comprising the steps of producing an air vortex within said combustion chamber and selectively injecting either gasoline or diesel fuel into said combustion chamber in such a manner that, with the compression ratio remaining the same, the strength of the air vortex and the penetrating power of the injected fuel are so matched to one another substantially over the entire combustion chamber, as seen in a plane perpendicular to the cylinder axis that the injected fuel fails to reach the cylinder walls and is deflected prior thereto essentially in the circumferential direction by the air vortex.

7. A method for operating an internal combustion engine at the same compression ratio either as gasoline engine with externally-controlled ignition or as diesel engine with auto-ignition, said engine having cylinder means, piston means defining at least in part a combustion chamber, injection means, said compression ratio being relatively low for diesel engines and relatively high for Otto engines, comprising the steps of producing an air vortex, and selectively injecting from said injection means either gasoline fuel or diesel fuel into said combustion chamber in such a manner that, with the compression ratio remaining the same, the strength of the air vortex and the penetrating power of the injected fuel are so matched to each other substantially over the entire combustion chamber as seen in a plane perpendicular to the cylinder axis that the injected fuel fails to reach the cylinder walls and is deflected prior thereto substantially in the circumferential direction.

8. A method for operating an internal combustion engine at the same compression ratio either as gasoline engine with externally-controlled ignition or as diesel engine with auto-ignition, said engine having cylinder means, piston means defining at least in part a combustion chamber of a shape substantially symmetrical about an axis substantially parallel to the cylinder axis, ignition means located approximately within the area of said first-mentioned axis, said compression ratio being relatively low for diesel engines and relatively high for Otto engines, comprising the steps of producing an air vortex about said first-mentioned axis, and selectively injecting from said injection means either gasoline fuel or diesel fuel into said combustion chamber substantially simultaneously in a plurality of directions spaced over the entire combustion chamber in such a manner that the strength of the air vortex and the penetrating power of the fuel jets are so matched to each other that the fuel jets fail to reach the cylinder walls and are deflected prior thereto substantially in the circumferential direction.

9. A method for operating an internal combustion engine at the same compression ratio either as gasoline engine with externally-controlled ignition or as diesel engine with auto-ignition, said engine having cylinder means, piston means defining at least in part a combustion chamber of a shape substantially symmetrical about an axis substantially parallel to the cylinder axis, injection means located approximately within the area of said first-mentioned axis, and spark-plug means located intermediate the injection means and the outer walls of said combustion chamber approximately half-way therebetween, said compression ratio being relatively low for diesel engines and relatively high for Otto engines, comprising the steps of producing an air vortex about said first-mentioned axis, and selectively injecting from said injection means either gasoline fuel or diesel fuel into said combustion chamber substantially simultaneously in a plurality of directions spaced over the entire combustion chamber in such a manner that the strength of the air vortex and the penetrating power of the fuel jets are so matched to each other that the fuel jets fail to reach the cylinder walls and are deflected prior thereto substantially in the circumferential direction.

References Cited in the file of this patent
UNITED STATES PATENTS

| | | |
|---|---|---|
| 2,484,009 | Barber | Oct. 11, 1949 |
| 2,709,992 | Graves | June 7, 1955 |